United States Patent [19]

Zimmermann

[11] Patent Number: 5,442,249
[45] Date of Patent: Aug. 15, 1995

[54] HORIZONTAL-AXIS ELECTRICAL MACHINE

[75] Inventor: Hans Zimmermann, Mönchaltorf, Switzerland

[73] Assignee: ABB Management AG, Baden, Switzerland

[21] Appl. No.: 238,662

[22] Filed: May 5, 1994

[30] Foreign Application Priority Data

Jul. 5, 1993 [DE] Germany ............ 43 22 268.4

[51] Int. Cl.$^6$ ................................. H02K 5/00
[52] U.S. Cl. ............................ 310/91; 310/89; 310/217; 310/258
[58] Field of Search ............ 310/89, 91, 217, 258, 310/254, 51

[56] References Cited

U.S. PATENT DOCUMENTS

| | | |
|---|---|---|
| 2,973,442 | 2/1961 | Wilson . |
| 3,708,707 | 1/1973 | Kranz ............... 310/258 |
| 3,988,622 | 10/1976 | Starcevic ............ 310/91 |
| 4,425,523 | 1/1984 | Detinko ............. 310/258 |
| 4,469,973 | 9/1984 | Guyot et al. . |
| 4,634,909 | 1/1987 | Brem ................ 310/91 |
| 4,663,553 | 5/1987 | Zimmermann . |
| 4,975,613 | 12/1990 | Brem et al. . |
| 5,023,501 | 6/1991 | Zimmermann ....... 310/258 |
| 5,117,140 | 5/1992 | Sargeant ............ 310/91 |

FOREIGN PATENT DOCUMENTS

| | | |
|---|---|---|
| 22314 | 1/1981 | European Pat. Off. . |
| 906475 | 7/1949 | Germany . |
| 2948148 | 10/1989 | Germany . |
| 665507 | 5/1988 | Switzerland . |
| 1412604 | 6/1985 | U.S.S.R. . |

Primary Examiner—R. Skudy
Attorney, Agent, or Firm—Oblon, Spivak, McClelland, Maier, & Neustadt

[57] ABSTRACT

Horizontal-axis electrical machine having a stator laminate core (1) which is arranged in a housing (2, 3) which is split horizontally, which stator laminate core (1) is clamped by means of fastening wedges (35), which are distributed over its circumference, in supporting rings (32), which are arranged orthogonally to the machine longitudinal axis and are spaced apart from one another. The supporting rings are connected on their external circumference, via fastening parts (39, 40), to the housing lower part (2) of the machine. The supporting rings (32) have azimuthal fastening plates which run symmetrically with respect to the vertical plane of symmetry of the machine.

In order to decouple the stator laminate core (1) from the housing lower part (2), the fastening plates (40) are fastened to the said supporting rings such that they are sprung horizontally in the radial direction, the fastening plate (40) itself being constructed as a leaf spring, or acting as such.

26 Claims, 5 Drawing Sheets

Detail: X

HORIZONTAL-AXIS ELECTRICAL MACHINE

BACKGROUND OF THE INVENTION

1. Field of the Invention

The invention relates to a horizontal-axis electrical machine having a stator laminate core which is arranged in a housing which is split horizontally and is stiffened by housing formers, which stator laminate core is clamped by means of fastening wedges, which are distributed over its circumference, in supporting rings, which are arranged orthogonally to the machine longitudinal axis, are spaced apart from one another and are connected on their external circumference, via fastening parts, to the housing lower part of the machine, which fastening parts have azimuthal fastening plates which run symmetrically with respect to the vertical plane of symmetry of the machine.

The invention at the same time makes reference to a prior art as results, for example, from CH-PS 665,507 or U.S. Pat. No. 4,663,553.

2. Discussion of Background

In the case of gas-cooled electrical machines over the entire power range, large axial and radial expansions occur in the stator laminate core which must be transmitted to the housing distributed as uniformly as possible.

In the case of the air-cooled turbogenerator which is known from CH-PS 665,507, this is done by lateral suspension of the stator laminate core by means of supporting rings which are arranged parallel, are at right angles to the axis of the electrical machine and are spaced apart from one another. In order to keep vibrations and thermal stresses which occur during the operating mode of the electrical machine as small as possible, the supporting rings are connected to the housing lower part by means of fastening parts, via extensions which run vertically in a straight line, on both sides in two regions of their vertical plane of symmetry. By far the greater majority of the circumference of the supporting plates is spaced apart from the housing upper part and housing lower part. The stator laminate core is clamped in the supporting plates by means of fastening wedges which are distributed uniformly over its entire circumference. The fastening parts comprise fastening plates which are in each case welded to the extensions of the supporting plates, as well as horizontal-axis tube elements which are welded both to the fastening plates and the housing lower part. This fastening of the stator laminate core allows simple assembly, easy accessibility to the structural parts which are to be welded and ensures good quality of the welded seams.

In the case of large air-cooled turbogenerators, the laminate core vibrations at twice the frequency and the sound emissions resulting from this become very large. However, as the size of the machine increases, the stresses in the components and welded seams of the connecting points to the housing also increase. This can result in so-called low-cycle fatigue cracks as a consequence of laminate core vibrations and thermal alternating stresses of the start/stop cycles.

SUMMARY OF THE INVENTION

Accordingly, one object of the invention is to provide a novel vibration-insulated and sound-insulated suspension of the stator laminate core in the machine housing in the case of a horizontal-axis electrical machine of the generic type mentioned initially, which suspension manages without costly springing elements and/or supporting elements and accordingly has a simple and economical construction.

In the case of a horizontal-axis electrical machine of the generic type mentioned initially, this object is achieved according to the invention in that the fastening plates are fastened to the said supporting rings horizontally and such that they are sprung in the radial direction, the fastening plate itself being constructed as a leaf spring, or acting as such.

The connection according to the invention of the stator laminate core to the housing lower part results in optimum suspension which will withstand all the operating stresses and makes possible vibration-insulated and sound-insulated laminate core suspension. Furthermore, the design is also economical.

In the case of gas-cooled electrical machines, the annular space between the stator laminate core and the housing jacket is divided regularly into a plurality of chambers which are used for the inlet and outlet of the cooling gas. These spaces are formed by transverse walls or formers which are fastened to the internal circumference of the housing lower part and housing upper part. The formers are at the same time used for stiffening the housing. In the case of a preferred development of the invention, these formers are now stiffened, at least in the housing lower part, by reinforcing elements, which are in the form of half rings, being welded or screwed to their inner circumference. These reinforcing elements increase the moment of inertia of the formers and thus likewise have a muffling and vibration-damping effect. At the same time, these reinforcing pieces offer the capability of creating additional screw points for the connection of the housing upper part to the housing lower part, which leads to a further contribution to increasing the stiffness of the housing and thus to reducing vibration.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The fundamental construction of the air-cooled turbogenerator corresponds largely to that of the electrical machine which is known from CH-PS 665,507 or U.S. Pat. No. 4,663,553.

Figure 1:
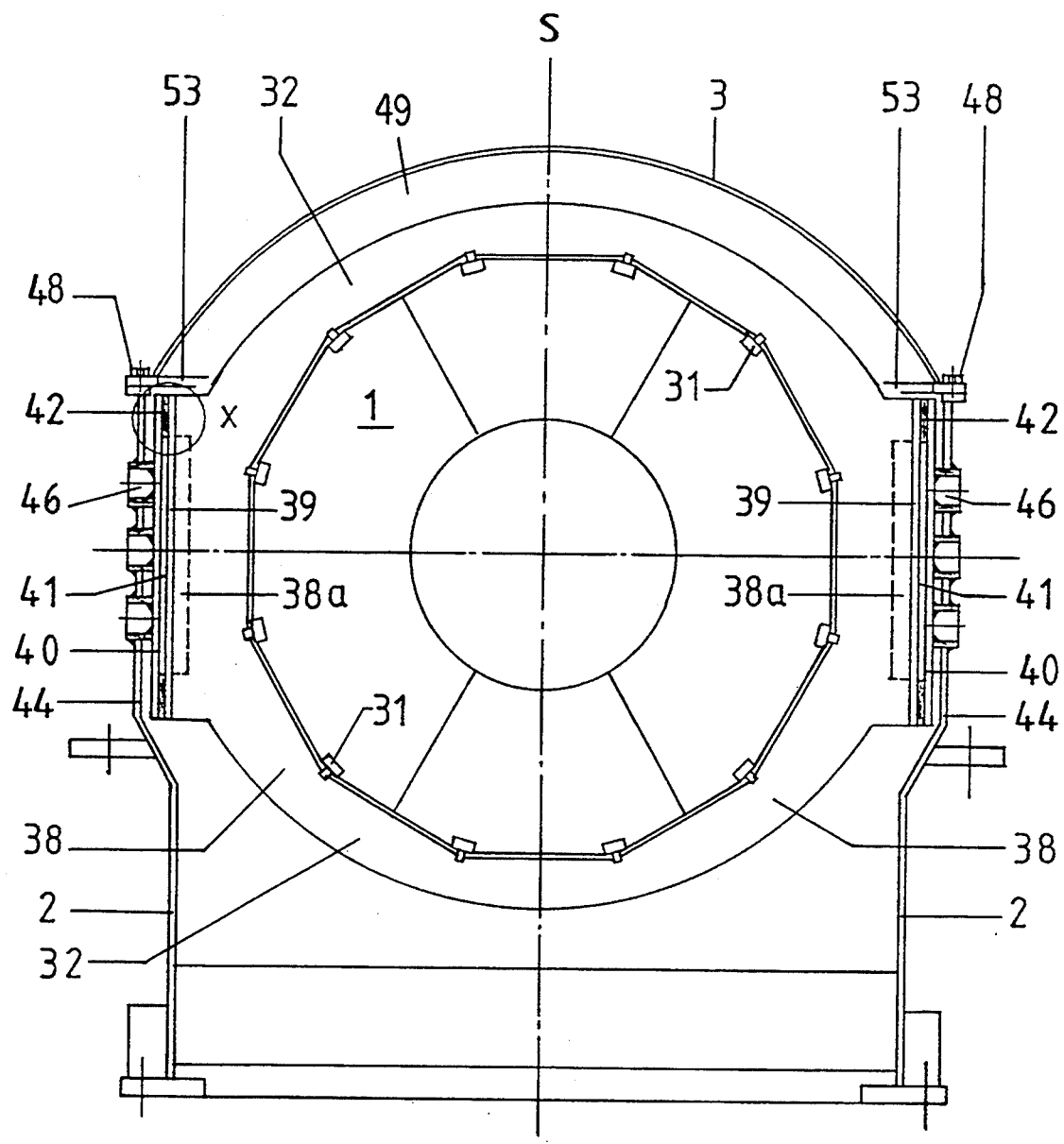
FIG. 1 shows a simplified cross-section through the stator of an air-cooled electrical machine, at the level of the supporting rings.
Figure 1A:
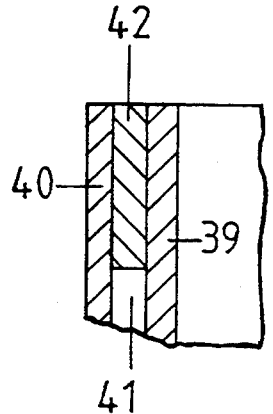
FIG. 1a shows the detail X from FIG. 1.
Figure 2:
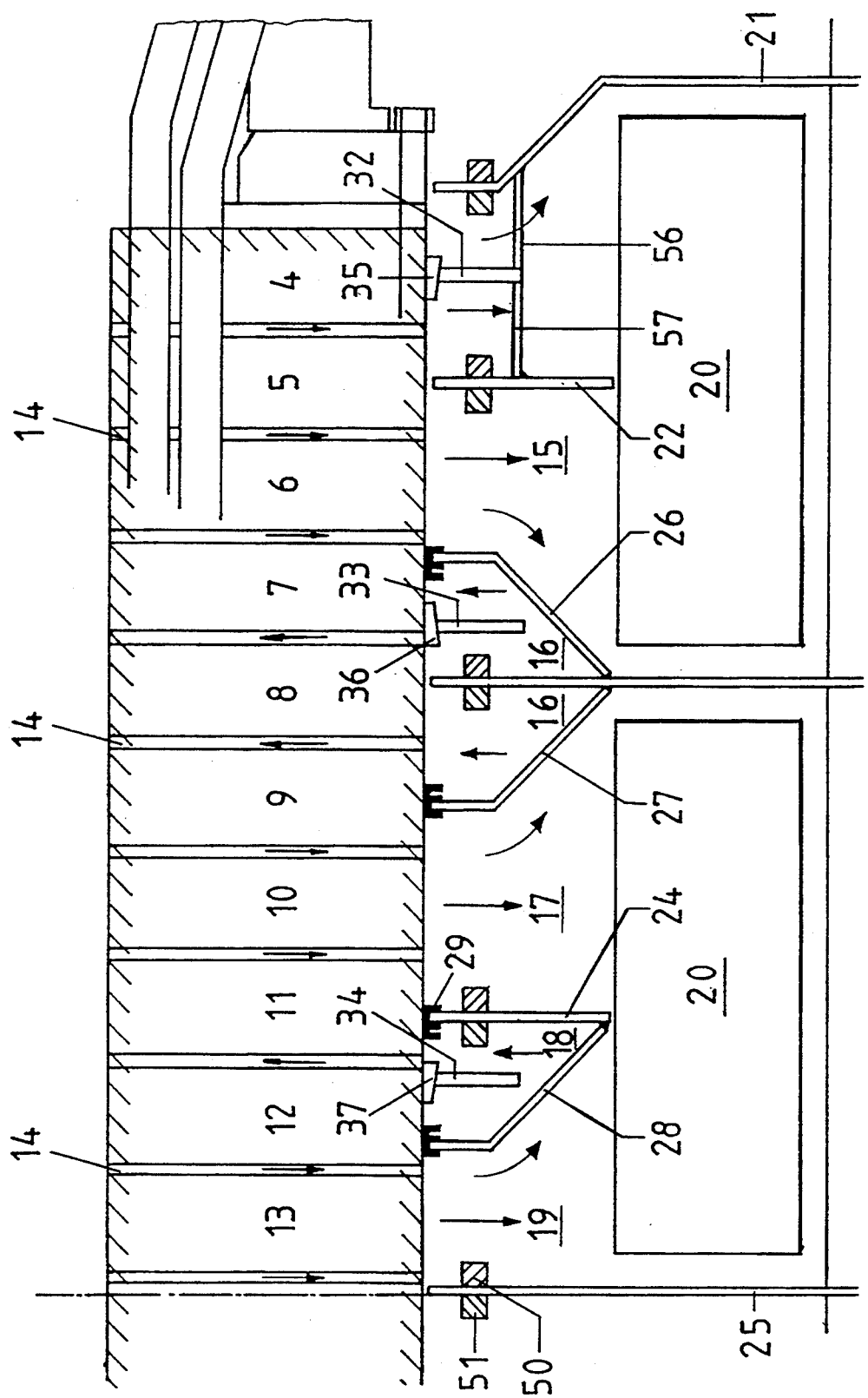
FIG. 2 shows a partial longitudinal section through the stator lower part of the machine according to FIG. 1.

Referring now to the drawings, wherein like reference numerals designate identical or corresponding parts throughout the several views, FIG. 1 shows a greatly simplified cross-section through the stator of an electrical machine and FIG. 2 shows the partial longitudinal section through the lower part of the machine of a stator laminate core 1 arranged in a two-piece, horizontally split housing having a housing lower part 2 and a housing upper part 3. The stator laminate core 1 comprises individual laminate core elements 4 to 13 which are spaced apart from one another axially. Cooling gas flows into or out of the chambers 15 to 19, through these gaps 14, in the space between the stator laminate core 1 and the housing lower part 2 or housing upper part 3 respectively. The chambers 15, 17 and 19 are hot-gas chambers into which the heated cooling air flows from the stator laminate core 1 and is then supplied to coolers 20 underneath the machine. The chambers 16 and 18 are fresh-gas chambers through which air coming from the coolers 20 is passed into the gaps 14 between the laminate core elements 4, 5, ..., 13. These chambers are formed by housing formers 21 to 25 and by separating metal sheets 26 to 28 which are fastened to the inner wall of the housing lower part 2 and housing upper part 3 and to the housing formers. Wherever the housing formers and separating metal sheets separate hot-gas chambers from fresh-gas chambers, the ends pointing towards the laminate core 1 are provided with elastic seals 29.

The suspension/fastening of the stator laminate core 1 in the lower housing part 2 is carried out in the same manner as that described in EP-PS 0,166,114 or U.S. Pat. No. 4,663,553.

Compression beams 31 which extend over the entire length of the stator laminate core 1 and are welded to the laminate core 1 after it has been compressed are inserted into slots. In turn, supporting rings 32 to 34 are in each case fastened to these compression beams 31, with the interposition of fastening wedges 35 to 37.

Figure 3:
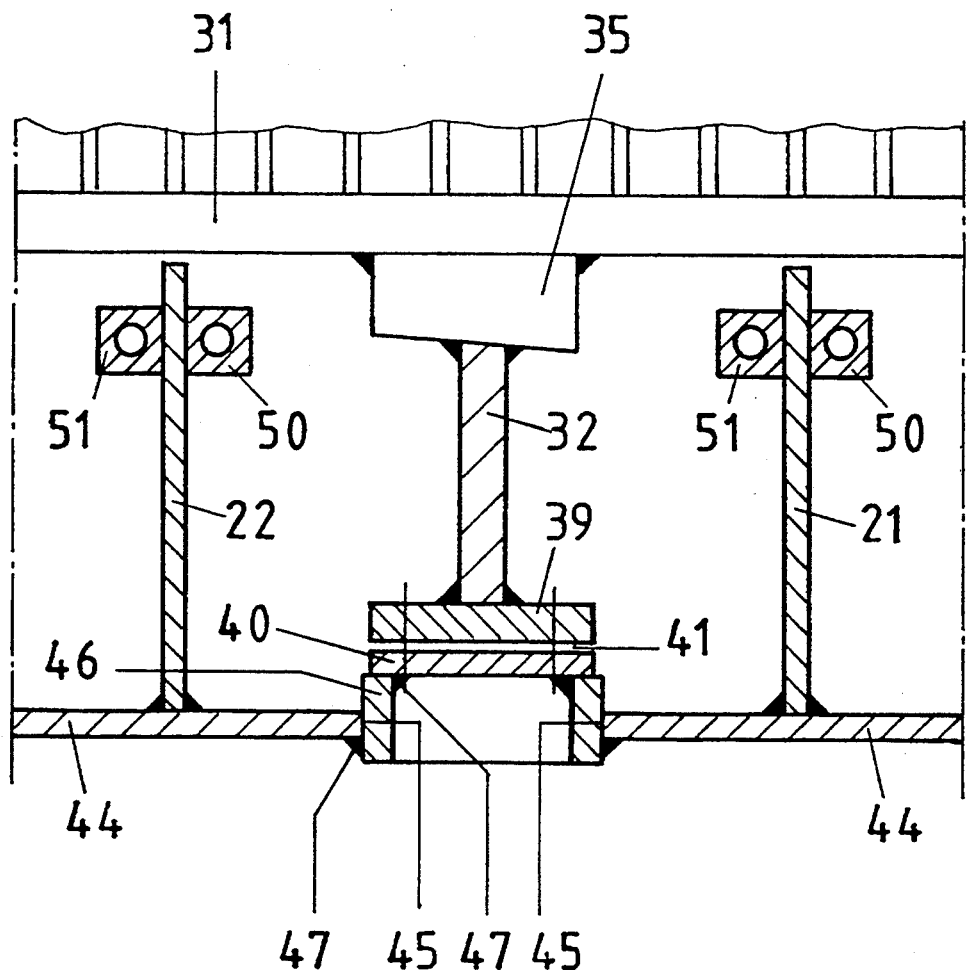
FIG. 3 shows a partial horizontal section through the horizontal plane of symmetry of the electrical machine.
Figure 4:
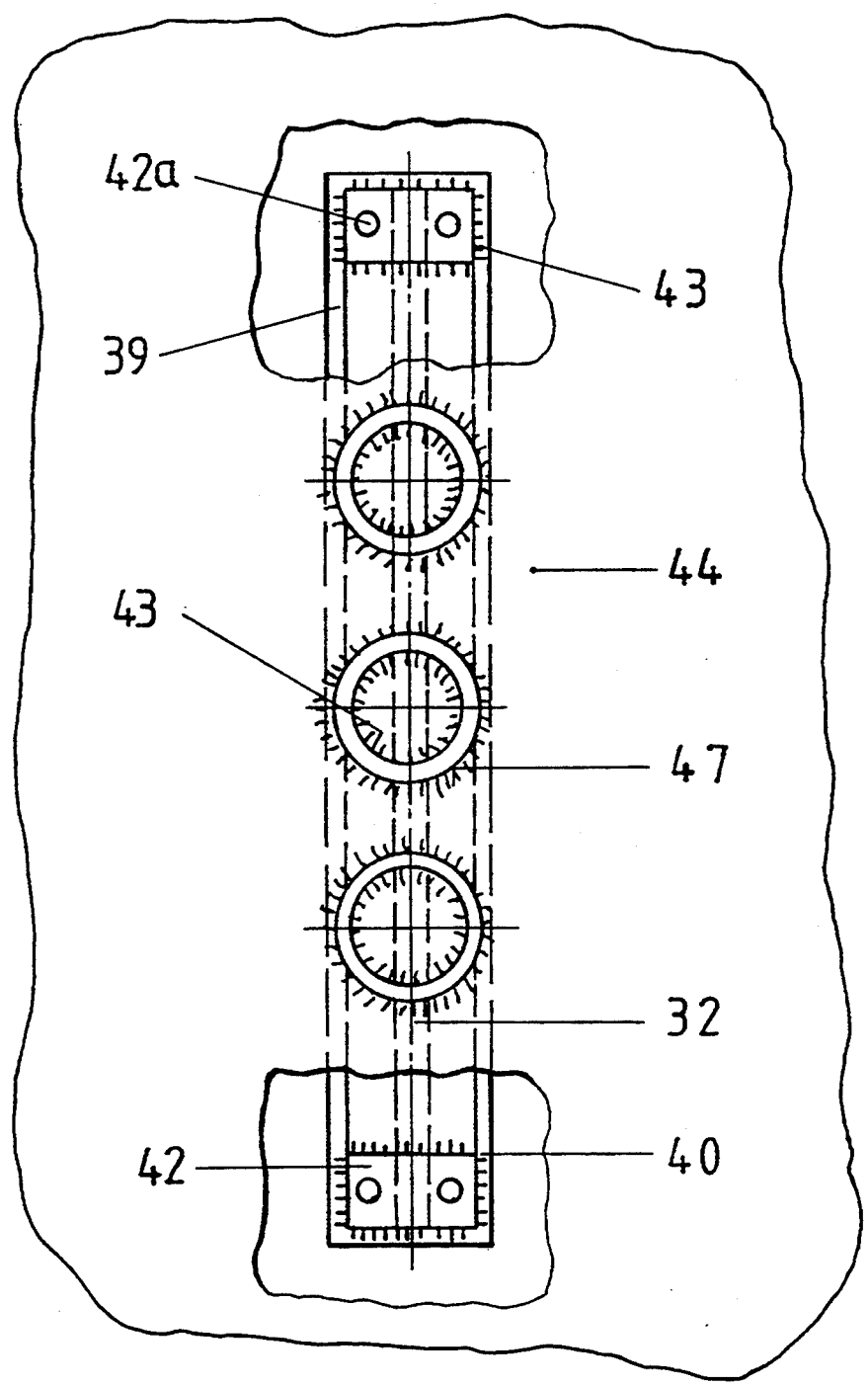
FIG. 4 shows a plan view of a fastening point of the stator laminate core to the housing.

As can be seen from FIGS. 1 and 3, the supporting rings 32, ... have a lateral horizontal extension 38 to which a plate 39 is welded, which runs vertically, azimuthally. A fastening plate 40 is fastened, preferably by welding, to this plate 39, leaving a gap 41 whose size is approximately 5 to 10 mm. The gap 41 extends essentially only over the central section of this double-plate arrangement 39/40. It is formed by in each case one liner 42, having a thickness which corresponds to the gap width, being pushed in between these two plates 39 and 40 at each end, before the said plates 39 and 40 are welded to this liner at the edges (welded seams 43 in FIG. 4). Bolts 42a are used as an assembly aid and for reinforcing the welded connection between the two plates 39 and 40.

In this way, the fastening plate 40 can carry out relative movements in its central section with respect to the plate 39; the fastening plate 40 may be regarded as a horizontally acting leaf spring but it does not act as such in the circumferential direction and in the axial direction. The spring movement and spring stiffness of this leaf spring can be predetermined by means of its material properties, dimensions (in the horizontal direction and vertical direction) and the distance between the two liners 42.

A further possibility for fastening the fastening plate 40 in a sprung manner with respect to the supporting ring (in its central section) is for the fastening plate 40 to be firmly connected to the supporting ring 32 only at its upper end and lower end, in such a manner that a gap remains free between the supporting ring 32 and the central section of the fastening plate. For this purpose, the vertically running edge of the extension 38 has a recess 38a (shown by dashed lines in FIG. 1).

The actual fastening of the stator laminate core 1 together with its supporting rings 32, ... and the plates 39, fastened thereto, and fastening plates 40 is now completed in the same manner as that which is described and illustrated in CH-PS 665,507 or U.S. Pat. No. 4,663,553.

In the region of the supporting rings, the housing lower part 2 has vertically running flat housing sections 44 which are broader horizontally and vertically than the fastening plates 40. Three circular holes 45, which are located one above the other, are arranged in the said housing section 44 symmetrically with respect to the plane which is defined by the supporting rings 32, ... Once the stator laminate core 1 together with its supporting rings has been lowered into the housing lower part 2 and has been aligned, short tubular elements 46 are inserted into these holes 45 until they rest against the fastening plate 40. The external diameter of these tubular elements in this case corresponds to the internal diameter of the holes 45. The tubular elements are then welded internally to the fastening plate 40 and externally to the said flat housing section 44 (welded seams 47). The arrangement and distribution of the tubular elements 46 in the vertical direction is in this case selected such that all the tubular elements 46 come to rest in the central section of the fastening plate 40, and a separation of approximately 200 to 300 mm remains between the two outer tubular elements and the inner ends of the liners 42. Only in this way can the fastening plate 40 carry out the function, allocated to it, of a leaf spring.

After this, the housing upper part 3 is screwed to the housing lower part 2 by means of housing bolts 48, said housing upper part 3 likewise being provided with housing formers 49 (FIG. 1) which, in addition to stiffening the housing upper part, are also used as separating walls between the hot-gas and fresh-gas chambers, and for this reason are at the same axial level as the formers 21, ..., 25 in the lower housing part 2.

The technical and economical advantages of the design (designs) described above are represented in summarized form as follows:

The laminate core suspension provides the required strength in the circumferential direction and, as a result of the lateral extensions 38, ... on the supporting rings 32, ..., also the required elasticity in the axial direction. Furthermore, the housing is decoupled in terms of vibration and acoustically from the stator laminate core by means of the leaf springs (fastening plates 40). In addition, the stator is simple and economical to produce. The design "to accept tolerances" must be stressed. Particularly in the radial direction, tolerances of virtually any size can be accepted. This is particularly important in order to be able to compensate for welding inaccuracies without complex and expensive test assemblies being required in the course of production.

Figure 5:
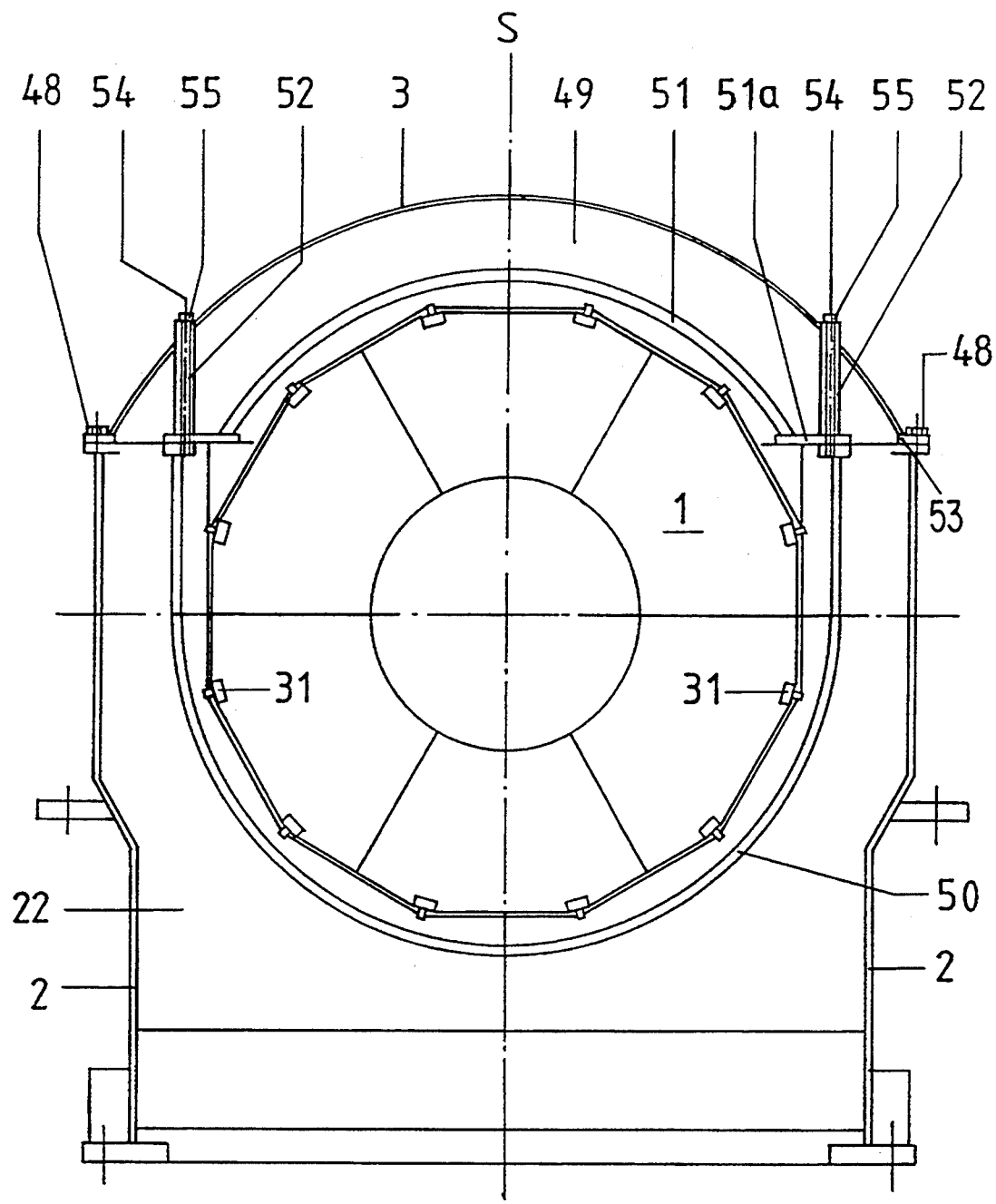
FIG. 5 shows a simplified cross-section through the stator of an air-cooled electrical machine, at the level of the housing formers.

A major aspect of the vibration decoupling mentioned above of the stator laminate core 1 and the housing is the stiffness of the housing. Admittedly, the housing formers 21, ... and 49 mentioned above act in a stiffening manner; however, the separating point between the housing lower part 2 and the housing upper part 3 could be regarded as a weakness in this sense. An increase in the stiffness of the complete housing can be achieved if, according to a preferred development of the invention according to FIG. 5, the housing formers are provided both in the lower housing part 2 and in the upper housing part 3 with reinforcing elements 50 and 51 respectively, for example iron plates, which are arranged in pairs, are like half rings and are fastened laterally to the radially inner ends of the formers, for example by being welded to them. The reinforcing elements 50, 51 are preferably located on the radially inner circumference of the housing formers 22, . . . , 49. This measure increases the moment of inertia of the formers and finally, thus, the stiffness of the two housing halves 2 and 3. The reinforcing elements 50 and 51 furthermore offer the capability of incorporating additional screw points for the connection of the two housing halves.

For this purpose, a vertically running tube 52 is inserted in the housing upper part 3 at the axial level of each former 49, and is welded to said housing upper part 3. This tube extends as far as the horizontal separating point 53 between the housing lower part and housing upper part. Threaded holes 54, into which threaded bolts 55 are screwed, are provided on the formers 21, . . . of the housing lower part 2, in the end surfaces of the reinforcing elements 50 and 51. Alternatively, nuts can also be provided on the reinforcing elements 50, 51 (not shown).

The use of leaf springs results in—as mentioned further above—a comparatively "soft" suspension of the stator laminate core 1 in the housing. In order now to prevent the laminate core from being suspended too softly in the leaf springs, the two outer supporting rings are connected, via horizontally running thrust plates, to the housing lower part 2 underneath the stator laminate core 1 and symmetrically with respect to the vertical plane of symmetry S of the machine. In FIG. 2, these thrust plates are designated by the reference numbers 56 and 57 respectively. They are welded on the one hand to the outer supporting ring 32 and on the other hand to the housing formers 21 and 22 respectively. As a result of their horizontal arrangement, they are soft in the vertical direction, but are stiff in the horizontal direction (axially and laterally). In this way, they additionally contribute to decoupling of the stator laminate core from the housing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A horizontal-axis electrical machine having a stator laminate core which is arranged in a housing which is split horizontally such that said housing includes a housing upper part and a housing lower part, wherein said housing is stiffened by housing formers, and wherein said stator laminate core is clamped by means of fastening wedges which are distributed over its circumference, in supporting rings which are arranged orthogonally to a machine longitudinal axis, said supporting rings being spaced apart from one another and each are connected on their external circumference to the housing lower part of the machine by fastening plates disposed between the external circumference of each supporting ring and said housing lower part, wherein said fastening plates extend symmetrically with respect to a vertical plane of symmetry of the machine, wherein the fastening plates are connected to the said supporting rings such that they are sprung horizontally in a radial direction, each fastening plate providing a spring coupling between the external circumference of one of said supporting rings and said housing.

2. The machine as claimed in claim 1, wherein a plate is provided between the fastening plate and the supporting ring, which plate extends parallel to the fastening plate and is firmly connected to the supporting ring, and wherein a gap is provided between said plate and said fastening plate in a central section of said plate.

3. The machine as claimed in claim 1, wherein the fastening plate is firmly connected to the supporting ring at an upper end and a lower end such that a gap is provided between the supporting ring and a central section of the fastening plate, with the central section disposed between the upper end and lower end.

4. The machine as claimed in claim 1, wherein the housing formers are stiffened, at least in the housing lower part, by reinforcing elements on which housing bolts engage from the housing upper part.

5. The machine as claimed in claim 2, wherein the housing formers are stiffened, at least in the housing lower part, by reinforcing elements on which housing bolts engage from the housing upper part.

6. The machine as claimed in claim 3, wherein the housing formers are stiffened, at least in the housing lower part, by reinforcing elements on which housing bolts engage from the housing upper part.

7. The machine as claimed in claim 4, wherein the housing bolts are guided through vertically extending tubes which are arranged in the housing upper part and which extend to a horizontal separating point of the housing upper part and the housing lower part.

8. The machine as claimed in claim 5, wherein the housing bolts are guided through vertically extending tubes which are arranged in the housing upper part and which extend to a horizontal separating point of the housing upper part and the housing lower part.

9. The machine as claimed in claim 6, wherein the housing bolts are guided through vertically extending tubes which are arranged in the housing upper part and which extend to a horizontal separating point of the housing upper part and the housing lower part.

10. The machine as claimed in claim 1, wherein at least two outer supporting rings are connected to the housing lower part via horizontally extending thrust plates disposed underneath the stator laminate core and symmetrically with respect to the vertical plane of symmetry of the machine.

11. The machine as claimed in claim 2, wherein at least two outer supporting rings are connected to the housing lower part via horizontally extending thrust plates disposed underneath the stator laminate core and symmetrically with respect to the vertical plane of symmetry of the machine.

12. The machine as claimed in claim 3, wherein at least two outer supporting rings are connected to the housing lower part via horizontally extending thrust plates disposed underneath the stator laminate core and symmetrically with respect to the vertical plane of symmetry of the machine.

13. The machine as claimed in claim 4, wherein at least two outer supporting rings are connected to the housing lower part via horizontally extending thrust plates disposed underneath the stator laminate core and symmetrically with respect to the vertical plane of symmetry of the machine.

14. The machine as claimed in claim 5, wherein at least two outer supporting rings are connected to the housing lower part via horizontally extending thrust plates disposed underneath the stator laminate core and symmetrically with respect to the vertical plane of symmetry of the machine.

15. The machine as claimed in claim 6, wherein at least two outer supporting rings are connected to the housing lower part via horizontally extending thrust plates disposed underneath the stator laminate core and symmetrically with respect to the vertical plane of symmetry of the machine.

16. The machine as claimed in claim 7, wherein at least two outer supporting rings are connected to the housing lower part via horizontally extending thrust plates disposed underneath the stator laminate core and symmetrically with respect to the vertical plane of symmetry of the machine.

17. The machine as claimed in claim 8, wherein at least two outer supporting rings are connected to the housing lower part via horizontally extending thrust plates disposed underneath the stator laminate core and symmetrically with respect to the vertical plane of symmetry of the machine.

18. The machine as claimed in claim 9, wherein at least two outer supporting rings are connected to the housing lower part via horizontally extending thrust plates disposed underneath the stator laminate core and symmetrically with respect to the vertical plane of symmetry of the machine.

19. The machine as claimed in claim 1, wherein said fastening plates are azimuthal fastening plates.

20. The machine as claimed in claim 2, wherein said fastening plates are azimuthal fastening plates.

21. The machine of claim 1, wherein each said fastening plate provides a leaf spring coupling between a supporting ring and said housing.

22. A horizontal-axis electrical machine having a stator laminate core which is arranged in a housing and which is split horizontally such that said housing includes a housing upper part and a housing lower part, wherein said housing is stiffened by housing formers, and wherein said stator laminate core is clamped by fastening wedges distributed over its circumference, in supporting rings, said supporting rings arranged orthogonally with respect to a machine longitudinal axis, with said supporting rings spaced from one another, and with said supporting rings each connected at their outer circumference to said housing of said machine by a plurality of fastening plates, such that at least one fastening plate is disposed between the external circumference of each supporting ring and said housing, with each fastening plate providing a spring coupling between the external circumference of one of said supporting rings and said housing with the spring coupling acting in a horizontal and radial direction.

23. The machine of claim 22, wherein a pair of said fastening plates are provided for each of said supporting rings, with fastening plates of each pair disposed symmetrically with respect to a vertical plane of symmetry of the machine.

24. The machine of claim 22, wherein a plate is provided between the fastening plate and the supporting ring, said plate extending parallel to the fastening plate, and wherein a gap is provided between said plate and said fastening plate in a central section of said plate.

25. The machine of claim 22, wherein each fastening plate is connected to a respective supporting ring at an upper end and at a lower end, and wherein a gap is provided between each respective supporting ring and fastening plate at a central section of the fastening plate, with the central section disposed between the upper end and the lower end.

26. The machine of claim 22, wherein each said fastening plate provides a leaf spring coupling between each respective supporting ring and said housing.

* * * * *